(12) United States Patent
Zhang

(10) Patent No.: US 7,811,363 B2
(45) Date of Patent: Oct. 12, 2010

(54) AIR PURIFIER WITH CARBON DIOXIDE SENSOR

(76) Inventor: Yue Zhang, Yuanda Road, Yuanda City, Changsha (CN) 410138

( * ) Notice: Subject to any disclaimer, the term of this patent is extended or adjusted under 35 U.S.C. 154(b) by 197 days.

(21) Appl. No.: 12/233,756

(22) Filed: Sep. 19, 2008

(65) Prior Publication Data

US 2009/0007778 A1 Jan. 8, 2009

Related U.S. Application Data

(63) Continuation of application No. PCT/CN2007/001143, filed on Apr. 9, 2007.

(30) Foreign Application Priority Data

Dec. 4, 2006 (CN) .................... 2006 2 0053025 U

(51) Int. Cl.
 *B03C 3/68* (2006.01)
(52) U.S. Cl. .................... 96/19; 95/3; 96/63; 96/96
(58) Field of Classification Search .................... 96/19, 96/26, 63, 111, 117, 397, 417, 96; 95/3, 95/8, 25, 78, 139
See application file for complete search history.

(56) References Cited

U.S. PATENT DOCUMENTS 2,990,911 A * 7/1961 Lippincott .................... 96/26
3,370,403 A * 2/1968 D'Elia et al. .................... 96/19
3,973,927 A * 8/1976 Furchner et al. .................. 95/3
4,439,216 A * 3/1984 Perryman ....................... 96/26
4,533,368 A * 8/1985 Snaddon et al. ................ 96/26
5,035,728 A * 7/1991 Fang ............................. 96/19
5,759,487 A * 6/1998 Jung ............................ 422/22
6,040,777 A * 3/2000 Ammann et al. ............ 340/632
6,355,095 B1 * 3/2002 Kuo-Long ....................... 96/26
6,616,736 B2 * 9/2003 Massey et al. ................. 96/25
6,623,544 B1 * 9/2003 Kaura ............................. 95/3
7,235,120 B2 * 6/2007 Dennis ........................... 95/2
7,381,245 B2 * 6/2008 Fleischer ........................ 96/18
2008/0092742 A1* 4/2008 Marra ............................ 96/16
2008/0110337 A1* 5/2008 Hoffman et al. ................ 95/3

FOREIGN PATENT DOCUMENTS

JP 3-242247 A * 10/1991 ....................... 95/3

* cited by examiner

*Primary Examiner*—Richard L Chiesa
(74) *Attorney, Agent, or Firm*—Matthias Scholl P.C.; Matthias Scholl

(57) ABSTRACT

Provided is an air purifier, including: a body having an air inlet and an air outlet, a blower, an electric control box, an electrostatic absorption device and a carbon dioxide sensor. The air purifier effectively removes dust particles and bacteria in the air, measures and controls the carbon dioxide content in the air, displays the content of carbon dioxide to users and helps to protect human health.

9 Claims, 1 Drawing Sheet

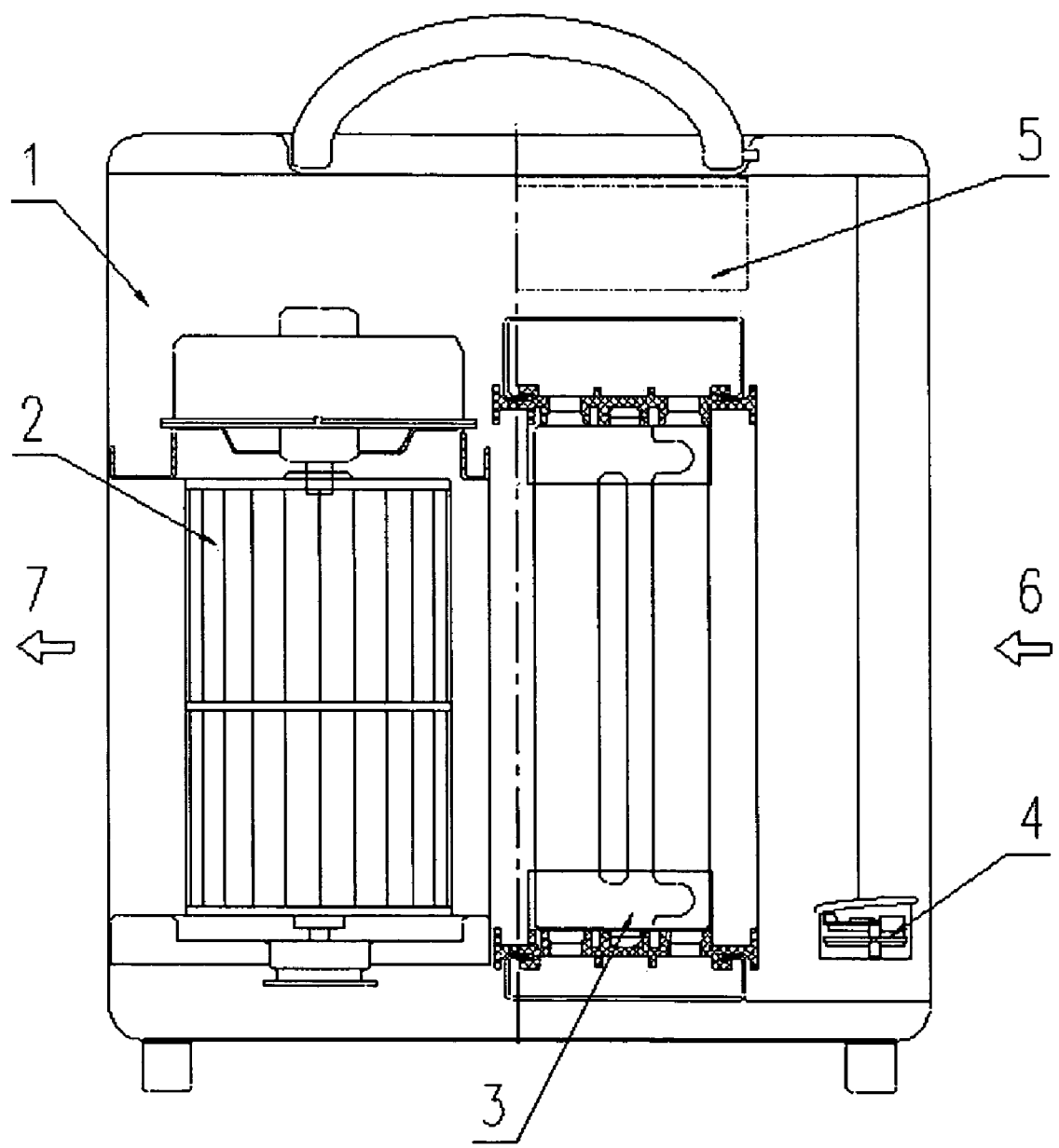

AIR PURIFIER WITH CARBON DIOXIDE SENSOR

CROSS-REFERENCE TO RELATED APPLICATIONS

This application is a continuation of International Patent Application No. PCT/CN2007/001143, with an international filing date of Apr. 9, 2007, designating the United States, now pending, which is based on Chinese Patent Application No. 200620053025.9, filed Dec. 4, 2006. The contents of all of these specifications, including any intervening amendments thereto, are incorporated herein by reference.

BACKGROUND OF THE INVENTION

1. Field of the Invention

The invention relates to an air purifier, and more particularly to an air purifier having a carbon dioxide sensor.

2. Description of the Related Art

Conventional air purifiers only feature such basic functions as filtering air and removing bacteria, and do not measure the content of carbon dioxide of the air. However, when indoor air is polluted and the carbon dioxide content exceeds a normal value, human health is severely jeopardized. Although there may be certain setups known to remove carbon dioxide from air, such setups do not have the goal of maintaining carbon dioxide level at a certain level or below.

SUMMARY OF THE INVENTION

In view of the above-described limitations, it is an objective of the invention to provide an air purifier with a carbon dioxide sensor capable of measuring and controlling the carbon dioxide content of the air, showing the content of carbon dioxide to users and sounding an alarm when the content of carbon dioxide exceeds a normal value so as to protect the health of occupants.

To achieve the above objectives, in accordance with one embodiment of the invention, provided is an air purifier, comprising: a body having an air inlet and an air outlet, a blower, an electric control box, an electrostatic absorption device and a carbon dioxide sensor. The blower is disposed in the air outlet of the body. The electrostatic absorption device and the carbon dioxide sensor are disposed in the air inlet of the body.

In a class of this embodiment or in another embodiment, the carbon dioxide sensor can also be disposed in the air outlet of the body.

In a class of this embodiment or in another embodiment, the electrostatic absorption device comprises a plurality of high voltage ionization wires and dust-collecting plates disposed alternately.

In a class of this embodiment or in another embodiment, the carbon dioxide sensor is connected to the electric control box and sends data obtained to a control system.

In a class of this embodiment or in another embodiment, the body of the air purifier employs a portable structure, a handle is disposed on the top of the body and support feet are disposed at the bottom of the body.

In a class of this embodiment or in another embodiment, the electrostatic absorption device and the carbon dioxide sensor are disposed in the air inlet of the air purifier.

Advantages of the invention comprise: removing dust particles, killing bacteria in the air, measuring the carbon dioxide content of the air, and alerting users to supply fresh air so as to prevent jeopardizing human health.

BRIEF DESCRIPTION OF THE DRAWINGS

The invention is described hereinbelow with reference to accompanying drawings, in which:

The sole FIGURE illustrates a schematic diagram of an air purifier with a carbon dioxide sensor in accordance with one embodiment of the invention.

Legend: 1. body; 2. blower; 3. electrostatic absorption device; 4. carbon dioxide sensor; 5. electric control box; 6. air inlet; 7. air outlet.

DETAILED DESCRIPTION OF THE EMBODIMENTS

As shown in the FIGURE, an air purifier of the invention comprises a body 1, a blower 2, an electrostatic absorption device 3, a carbon dioxide sensor 4 and an electric control box 5. The body 1 has an air inlet 6 and an air outlet 7. The electrostatic absorption device 3 and the carbon dioxide sensor 4 are disposed in the air inlet 6. The blower 2 is disposed in the air outlet 7. The carbon dioxide sensor 4 measures carbon dioxide content in the air and sends obtained data to the electric control box 5. The electric control box 5 displays the carbon dioxide content. When the carbon dioxide content exceeds a preset value, an alarm is activated and users are alerted to supply fresh air.

The body of the air purifier employs a portable structure, a handle is disposed on the top of the body and a support foot is disposed at the bottom of the body.

Embodiments of the present invention provide an unexpected benefit of being able to more accurately measure the content of carbon dioxide in air. Without wishing to be bound by theory, it is speculated that measuring of carbon dioxide in air is difficult when air is stationary and when air is impure with dust particles. The air purifier of the present invention ensures that dust particles are removed and that air is circulated around the carbon dioxide sensor so that the carbon dioxide concentration can be measured more accurately. The accuracy of measurement is improved up to 50% using this setup.

This invention is not to be limited to the specific embodiments disclosed herein and modifications for various applications and other embodiments are intended to be included within the scope of the appended claims. While this invention has been described in connection with particular examples thereof, the true scope of the invention should not be so limited since other modifications will become apparent to the skilled practitioner upon a study of the drawings, specification, and following claims.

What is claimed is:

1. An air purifier comprising
   a) a body having an air inlet and an air outlet;
   b) a blower;
   c) an electric control box;
   d) an electrostatic absorption device; and
   e) a carbon dioxide sensor;
   wherein
   said electrostatic absorption device is disposed in said air inlet and said carbon dioxide sensor is disposed in either one of said air inlet or said air outlet; and
   said blower is disposed in said air outlet.

2. The air purifier of claim 1, wherein said carbon dioxide sensor is disposed in said air outlet.

3. The air purifier of claim 1, wherein said carbon dioxide sensor is connected to said electric control box.

4. The air purifier of claim 1, wherein said electrostatic absorption device comprises a plurality of high voltage ionization wires and dust-collecting plates disposed alternately.

5. The air purifier of claim 1, wherein said body employs a portable structure.

6. The air purifier of claim 5, wherein a handle is disposed on the top of said body.

7. The air purifier of claim 6, wherein a plurality of support feet is disposed at the bottom of said body.

8. A method for purifying air from dust particles while simultaneously measuring the concentration of carbon dioxide in air and alerting a person in the need of purifying air from dust particles while simultaneously being alerted if the concentration of carbon dioxide in the air exceeds a certain value, comprising providing to said person the air purifier of claim 1.

9. The method of claim 8, wherein the concentration of air is measured up to 50% more accurately as compared to an air purifier without said blower and without said electrostatic absorption device.

* * * * *